INVENTORS.
FRANCIS J. KENT
BERNARD J. KLAVERKAMP
BY Arthur H. Seidel

ATTORNEY

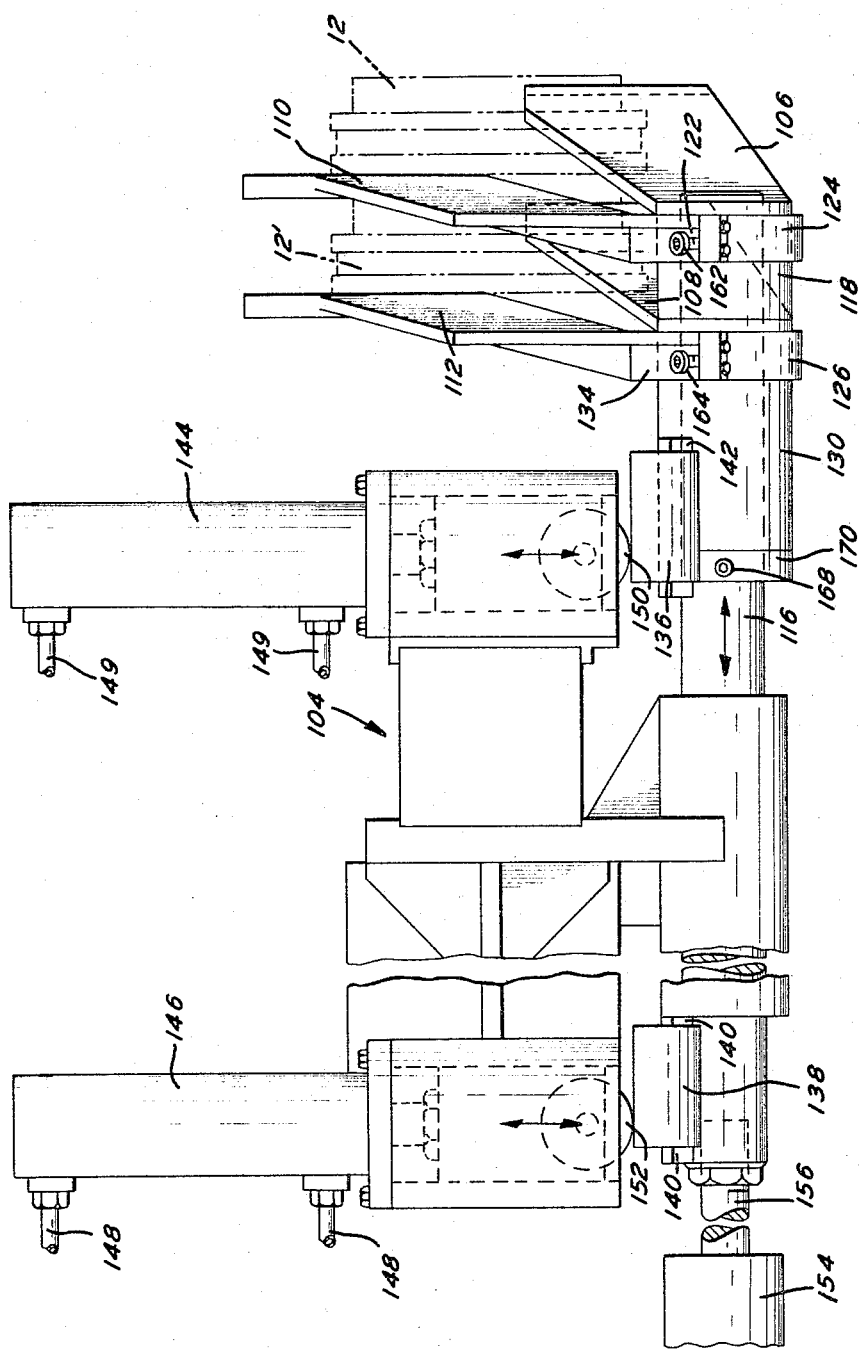

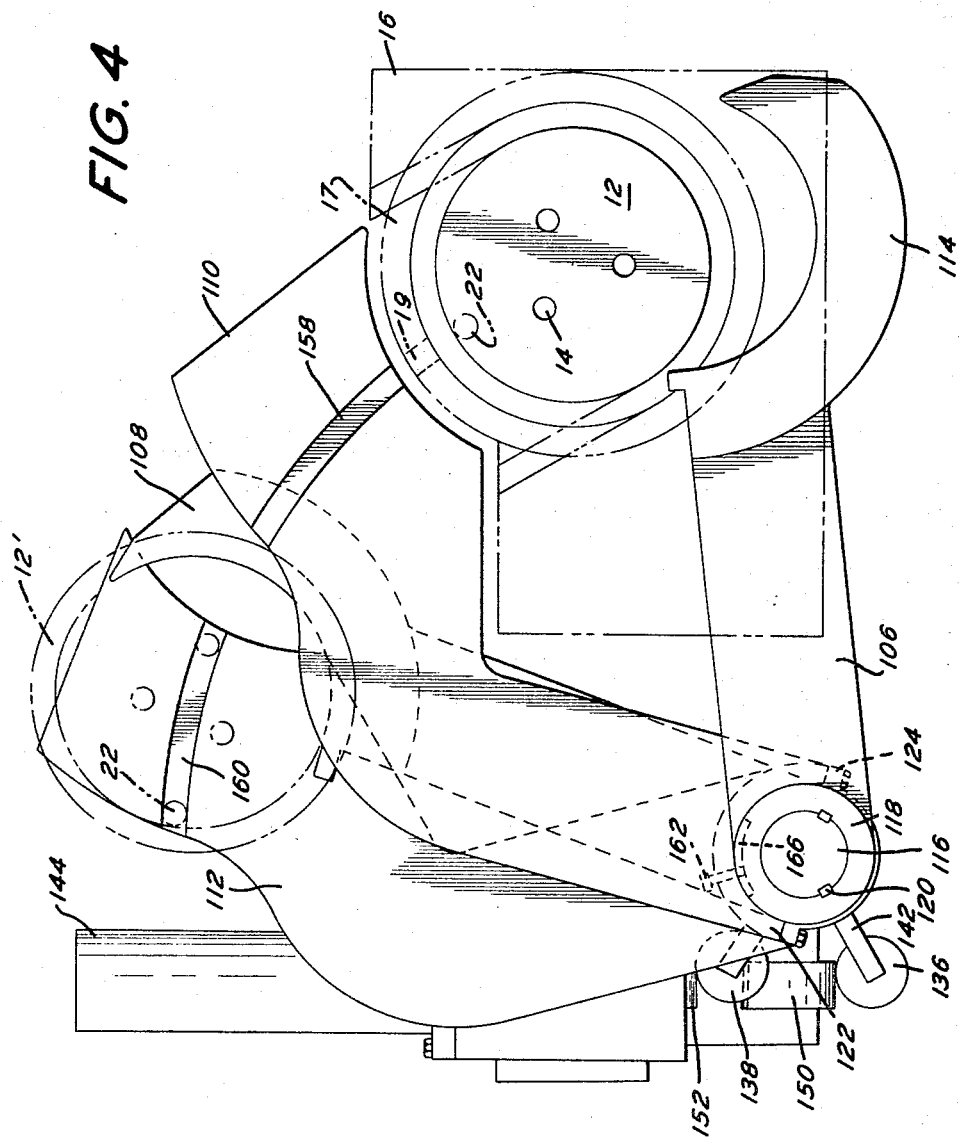

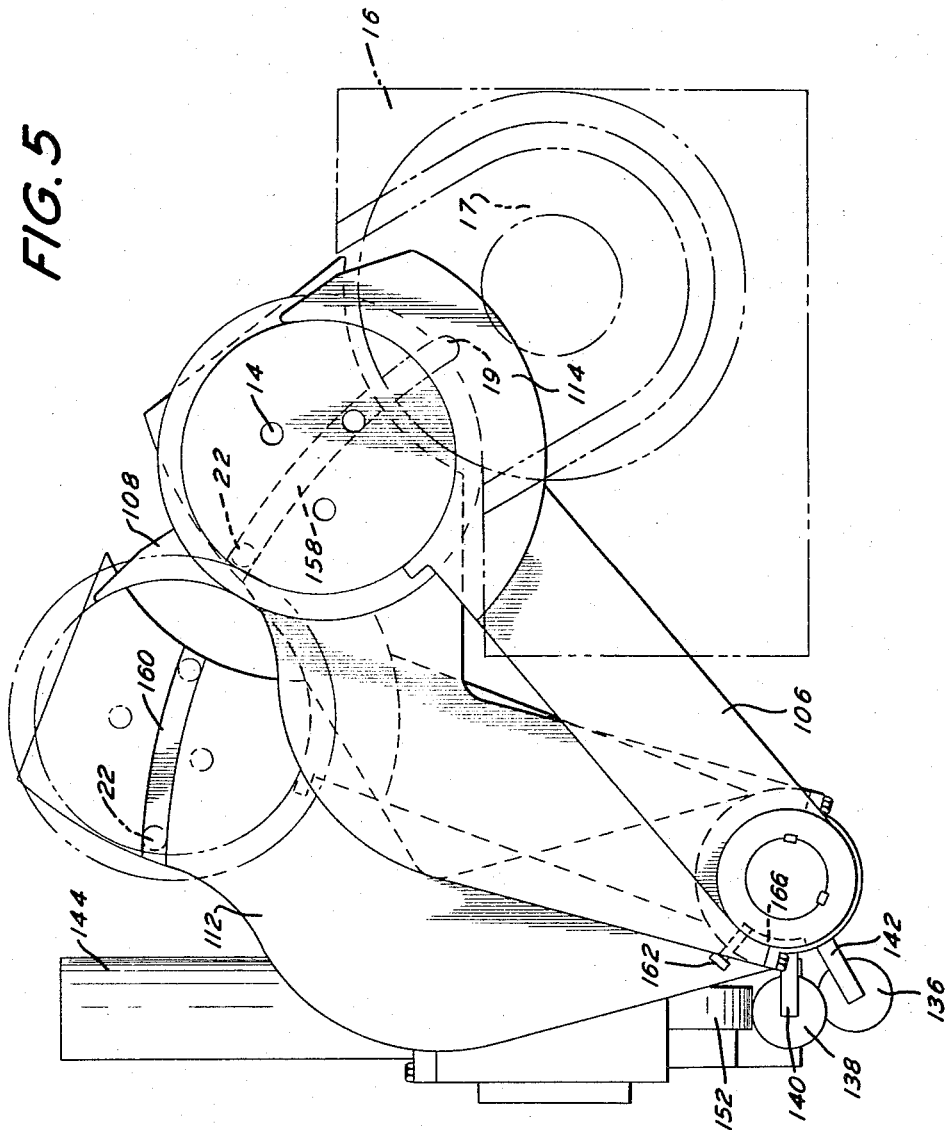

United States Patent Office 3,314,267
Patented Apr. 18, 1967

3,314,267
DIE CHANGER
Francis J. Kent and Bernard J. Klaverkamp, Wallingford, Pa., assignors, by mesne assignments, to Baldwin-Lima-Hamilton Corp., Philadelphia, Pa., a corporation of Delaware
Filed Apr. 28, 1964, Ser. No. 363,133
9 Claims. (Cl. 72—263)

This invention relates to a die changer, and more particularly, to apparatus adapted to be structurally interrelated with an extrusion press or the like having dies which are difficult to replace due to their size, weight, and/or inconvenient disposition.

Heretofore, the changing of a die on an extrusion press or the like has presented problems due to the weight, size and position of the die. This problem is compounded when the extrusion press has a die which must be replaced with a new die in a manner whereby the new die has the exact same orientation of the die openings as compared with the extrusion press or other structure which receives the extruded article.

When the extrusion press product has cross sectional shapes which are non-circular and non-symmetrical around the extrusion axis, the extrusion clearance passage in a fixed support bolster for the die as wall as any internal extrusion mandrel must be in exact relative position to the die passage, in order to produce the extrusion by exact cooperation of the shapes of the die, bolster and mandrel. Otherwise, if a new die is not replaced in the same orientation, the resulting extrusion section would not be exact, if not impossible. In many cases, the uniform orientation of the extrusion product is also important for the proper guidance of the product as it emerges from the press, as for instance in the case of multiple extrusions.

Thus, the apparatus of the present invention facilitates mechanical removal of dies and replacement with a new die having its die passages orientated in the same manner as was the old die. In accomplishing this result, the apparatus of the present invention is simple, reliable and structurally interrelated in a manner whereby the desirable result can be attained in a rapid manner with a minimum of physical labor.

It is an object of the present invention to provide a novel die changer.

It is another object of the present invention to provide a die changer for an extrusion press.

It is another object of the present invention to provide a mechanical die changer which will remove a die and replace it with a new one having its die passages orientated in the exact position that the die passages were in the old die.

It is another object of the present invention to provide a die changer which is simple, reliable and rapid while requiring a minimum of physical labor.

Other objects will appear hereinafter.

For the purpose of illustrating the invention, there is shown in the drawings a form which is presently preferred; it being understood, however, that this invention is not limited to the precise arrangements and instrumentalities shown.

FIGURE 3 is a side view in elevation of another embodiment of a die changer and an associated die of an extrusion press constructed in accordance with the principles of the present invention.

FIGURE 4 is an end view in elevation of the apparatus illustrated in FIGURE 3 prior to engagement of the die changer with the die.

FIGURE 5 is a view similar of FIGURE 4, but illustrating the position of the die changer after it has engaged the die.

Figure 1:
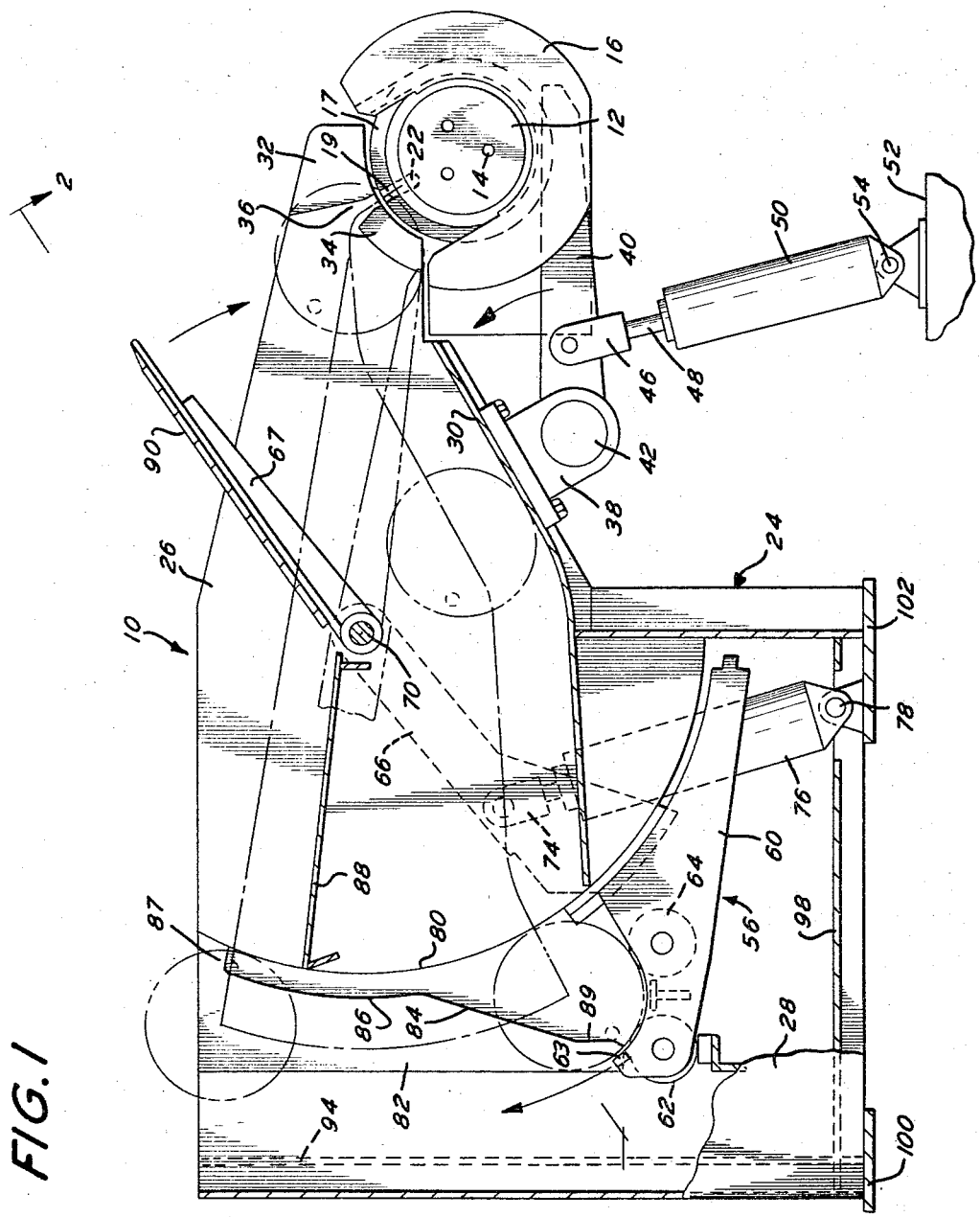
FIGURE 1 is a longitudinal sectional view of a die changer associated with the die of an extrusion press.

Referring to the drawing in detail, wherein like numerals indicate like elements, there is shown in FIGURE 1 a longitudinal sectional view of a die changer designated generally as 10 and positioned in a location whereby it may remove a die of an extrusion press and facilitate replacement of a new die having its die passages orientated in the same manner as the die passages were orientated on the old die. While the die changer apparatus 10 is illustrated and discussed herein in connection with an extrusion press, it will be understood that the general principles of the same may be utilized in connection with replacement of dies on other types of machinery.

The die changer 10 is illustrated juxtaposed to a portion of an extrusion press so as to be alongside of and lying substantially perpendicular to the direction of travel of the extruded product. Thus, in FIGURE 1 the extruded product would be issuing through the die openings 14 of the die 12. The die 12 is supported by a conventional cradle or die slide 16 movable from the clean out position illustrated to a position juxtaposed to the opening through the container supported in a housing 21. The die slide 16 is provided with a bolster 17 adjacent its rear face for preventing axial movement of die 12 relative to the die slide 16. The bolster 17 has an arcuate slot 19 extending substantially radially inward from its periphery.

The die 12 is provided with a pin or lug 22 extending in an axial direction and positioned adjacent its outer periphery. The lug 22 normally seats within the arcuate slot 19 in the bolster 17. The lug 22 facilitates removal of the die 12 in a particular manner and the presence of such a lug on a new replacement die facilitates replacement in a manner so that the die openings 14 of the new die are properly orientated as will be made clear hereinafter. For purposes of illustration, it will be noted that the die 12 is provided with three die openings 14 so that three extruded configurations will be simultaneously extruded and received by supporting apparatus not shown. Hence, when the die 12 is replaced, the new die must have its three die openings, or other orientation of die openings, in the proper manner so that the extruded product will be properly received and supported as it issues from the die openings.

Figure 2:
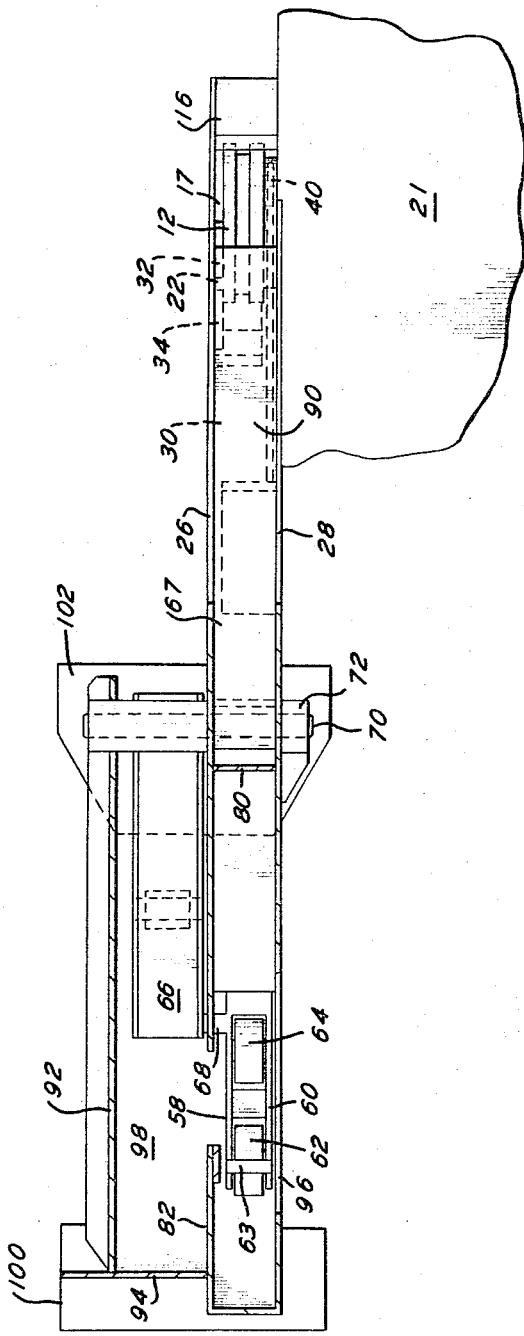
FIGURE 2 is a sectional view taken along line 2—2 in FIGURE 1.

The die changer 10 includes a frame designated generally as 24 having a pair of spaced parallel walls 26 and 28 which are shown more clearly in FIGURE 2. The runway or ramp 30 is provided between the walls 26 and 28. The righthand end of the ramp 30 terminates at a point adjacent to the die slide 16. A pair of guide plates 32 and 34 are fixedly secured to the wall 26 at the righthand end thereof adjacent to the die 12 and spaced from one another to define a guide channel 36. As shown more clearly in FIGURE 1, the juxtaposed surfaces of the guide plates 32 and 34 are contoured so that the channel 36 flares outwardly away from the die 12. The channel 36 is contiguous with the arcuate slot 19 in the bolster 17.

A trunnion 38 is removably coupled to the bottom surface of the runway 30. An arm 40 is provided with a bearing pin 42 at one end. Pin 42 is rotatably supported by the trunnion 38. The other end of arm 40 extends through a guide channel in die slide 16 to a position below the die 12.

A clevis 46 is pivotably secured at one end to the arm 40 at a point intermediate the ends of arm 40. Said point on arm 40 is preferably closer to pin 42 than other end of arm 40. The other end of clevis 46 is fixedly connected to one end of a piston rod 48. The other end of a piston rod 48 extends into a power cylinder 50.

The end of piston rod 48 which is disposed within cylinder 50 is connected to a piston not shown. Conventional means for introducing motive fluid to opposite sides of the piston within cylinder 50 are also not shown. The lower end of cylinder 50 remote from clevis 46 is pivotally supported at pin 54 by a support surface 52.

As shown more clearly in FIGURE 1, the lefthand end of runway 30 is lower than the righthand end thereof. At the lefthand end of runway 30, and below the same, there is illustrated in FIGURE 1 a receiving structure designated generally as 56. Receiving structure 56 includes spaced plates 58 and 60 coupled together by bridging members extending therebetween. As shown more clearly in FIGURE 1, the upper surface of plates 58 and 60 are generally dish-shaped.

Rollers 62 and 64 are rotatably supported between and by the plates 58 and 60. A limit stop 63 extends between the plates 58 and 60 above roller 62. The receiving structure 56 is disposed slightly to the left of the lefthand end of runway 30 and lies in the same plane as runway 30 which also is in the same plane as die 12.

The receiving structure 56 is fixedly connected to one end of arm 66 by connector rod 68. The other end of arm 66 is fixedly secured to a pin 70 rotatably supported in a cylindrical bearing 72. As will be clear from FIGURE 2, arm 66 lies in a plane which is offset with respect to the plane of receiving structure 56 and parallel thereto. An arm 67 lies in the plane of runway 30 and is also fixedly secured to the pin 70. The arms 66 and 67 are angularly disposed so as to, for all practical purposes, constitute a single arm.

One end of a clevis 74 is pivotable coupled to arm 66 intermediate its ends. The other end of clevis 74 is fixedly secured to one end of a piston rod. The piston rod extends into cylinder 76 and terminates in a piston within said cylinder 76. The lowermost end of cylinder 76 is pivotably coupled to the adjacent supporting surface by a pin 78. Conventional inlet and outlet conduits for motive fluid are not illustrated on the cylinder 76.

As shown more clearly in FIGURE 1, the lefthand end of wall 26 terminates in a curved edge 80. Curved edge 80 is a portion of a circle having as its center the longitudinal axis of pin 70. A wall 82 is provided in the same plane as wall 26 and to the left thereof as shown more clearly in FIGURE 2. A plate is secured to the edge of wall 82 which is juxtaposed to the curved edge 80. The last-mentioned plate is provided with an angularly disposed edge 84 which merges into curved edge 86. Curved edge 86 is a portion of a circle having as its center the longitudinal axis of pin 70. The upper end of curved edge 86 terminates in a limit stop 87. The curved edges 80 and 86 are spaced from one another by a sufficient distance so as to permit pin 22 to pass therebetween. The lowermost end of edge 84 terminates in a substantially vertical portion 89.

A ramp 88 extends between and is supported at its side edges by the wall 26 and edge 80. As shown more clearly in FIGURE 1, ramp 88 lies in a plane which is above the longitudinal axis of the pin 70. Ramp 88 is disposed at an angle extending from curved edge 80 toward the die 12. A ramp 90 is supported on the upper surface of arm 67. When arm 67 is in the phantom position illustrated in FIGURE 1, ramp 90 forms a continuation of ramp 88.

A wall 92 is provided parallel to wall 26 and in a position so that the arm 66 is disposed between said walls. Wall 92 supports one end of the cylindrical bearing 72. Wall 26 supports the other end of bearing 72. Wall 26 supports an intermediate portion of the bearing 72. End wall 94 extends between walls 92 and 26. The wall 28 is provided with an access opening 96 to facilitate removal of dies supported by the support structure 56 and replacement of new dies to be transferred to a position juxtaposed to the container 20. The apparatus is provided with a bottom wall 98 through which the lowermost portion of cylinder 76 extends. The apparatus 10 is provided with base plates 100 and 102, with the latter acting as a support for the lowermost end of cylinder 76.

The operation of the apparatus 10 is as follows:

With the die 12 supported in the die slide 16, the elements assume their solid line positions illustrated in FIGURE 1 after material has been extruded through the die passages or openings 14 and the die slide 16 has been moved to its clean out position. To remove the die 12 and replace the same with a new die, motive fluid is introduced into cylinder 50 to cause the arm 40 to rotate in a counterclockwise direction about pin 42. It is presumed that extrusion remnants and axial extrusion forces have been removed so that the die 12 is in a disposition for removal. As the arm 40 rotates about the longitudinal axis of pin 42, it raises the die 12 so that it rotates about an axis corresponding to the longitudinal axis of pin 42.

The pin 22 on the die 12 moves through arcuate slot 19 and guide channel 36. When the die 12 has thus been removed from the die slide 16, it rolls down the arm 40 onto the runway 30 and continues rolling until it is received in the cradle-like support of the support structure 56. In such disposition, the die 12 is supported by the rollers 62 and 64 and abuts the limit stop 63. Also, the pin 22 of the die supported in such position is against the edge 89 of the plate 82.

Thereafter, the die 12 may be removed through the opening 96 and a new die positioned in its place in the cradle-like support. In its travel from the die slide 16 to the cradle-like support of the support structure 56, the center line of the die 12 follows the phantom line extending therebetween. With a new replacement die supported by the cradle-like support of the support structure 56, motive fluid will be introduced into cylinder 76 to rotate the support structure 56 and arm 66 about the longitudinal axis of pin 70.

As arm 66 rotates about the longitudinal axis of pin 70, the new replacement die rotates to a position where in its pin 22 is guided by the surfaces 89, 84, 86 and 80 until it abuts against limit stop 87. During such travel of the replacement die, its center line follows the arcuate phantom line in FIGURE 1. It does not matter where the position of pin 22 is located when the replacement die is positioned on the cradle-like structure. Thus, regardless of the position of pin 22 on the replacement die, it will be guided by said last-mentioned surfaces and caused to always be positioned against limit stop 87.

At this point, it will be noted that the ramp 90 will be in line with ramp 88. Thereafter, the replacement die will roll due to gravity down ramps 88 and 90. As the replacement die rolls down said ramps, the pin 22 on the replacement die will automatically be in a position whereby it will pass through channel 36 and arcuate slot 19. The length of the ramps 88 and 90 is a function of the diameter of the replacement die. Since the starting point for the pin, namely limit stop 87, is a definite position, the pin 22 on the replacement die will automatically move through channel 36 and arcuate slot 19. Accordingly, the replacement die will roll into a position wherein it is supported by the die slide 16 and locked against axial movement by bolster 17 with the die openings 14 orientated in the same position as the die openings in the original die. The arm 40 rotates in a clockwise direction in FIGURE 1 as the replacement die is lowered in order to cushion its fall.

The above sequence of operation can be accomplished very rapidly with minimum manual labor and the apparatus 10 will reliably replace the new die in its proper disposition for resumption of extrusion operations. At any convenient time, motive fluid will be introduced into cylinder 76 to return the arms 66 and 67 to their solid line position in FIGURE 1. Hence, the apparatus is in a position for use when it is desired to exchange dies.

Instead of removing die 12 and replacing it with a new one, die 12 may be removed for the purpose of cleaning, cooling, relubrication and/or inspection and then replaced. By using more than one identical die, the down time on the extrusion press is reduced. By use of the apparatus illustrated in FIGURES 1 and 2, several dies may be stored and cooled between extrusions.

A second embodiment of the die changer which will carry out the previously described functions is illustrated generally by the numeral 104 in FIGURES 3–5.

The die changer 104 includes a first lifting arm 106 secured to a solid shaft 116 by means of keys 120. At its end remote from the shaft 116, the lifting arm 106 terminates in a lifting cradle 114 for removing a die 12 from the die slide 16. The die slide 16, shown in phantom, is the same as the die slide illustrated in FIGURES 1 and 2 and includes the bolster 17 in which has been formed an arcuate guide slot 19. The die 12 includes the extrusion openings, for instance holes 14, as well as the orientation pin 22. When the die 12 is to be removed from the die slide 16, the slide is moved to its clean out position relative to the container housing 21 as shown in FIGURE 3.

The first lifting arm 106 has a tubular shaft extension 118 extending laterally therefrom. As shown in FIGURES 4 and 5, the tubular shaft extension 118 is keyed to the shaft 116 by the keys 120, and thereby will rotate upon rotation of the shaft 116.

Since the die 12 will need support and restraint against lateral movement as soon as it leaves the die slide 16, a back-up plate 110 is mounted upon the tubular shaft extension 118. The back-up plate 110 has a bifurcated terminal portion which is placed concentrically about the tubular shaft extension 118. A collar 124 fastens the bifurcated end 122 of the back-up plate 110 to the shaft extension 118. The mounting of the back-up plate 110 upon the tubular shaft extension 118 is such that the first lifting arm 106 can rotate relative to the back-up plate 110. Hence, when the lifting arm 106 is rotated, it is adapted to grasp the die 12 and as soon as the pin 22 clears the arcuate slot 19 and the bolster 17, the die 12 is adapted to enter within an arcuate slot or guide 158 formed in the back-up plate 110. The center of curvature of the arcuate slot 158 is the axis of the shaft 116 whereby as the arm 106 moves relative to the back-up plate 110, the die can be maintained in a predetermined rotative disposition relative to the lifting arm 106. The solid portion of the back-up plate 110 will prevent lateral movement and tilting of the die.

A lost-motion connection is formed between the back-up plate 110 and its associated lifting arm 106. A screw or pin 162 is threaded through the bifurcated end of the back-up plate 110 into an arcuate slot 166 formed in the wall of the tubular shaft 118. As shown more clearly in FIGURE 5, when the pin 22 on the die 12 reaches the end of the arcuate slot 158 in the back-up plate 110, the end wall of the slot 116 will contact the screw or pin 162 whereby continued rotation of the lifting arm 106 will also force the back-up plate 110 to move in synchronization with it. In this manner, the die 12 is always located relative to the lifting arm due to the maintained position of the pin 22 of the die 12 within the arcuate slot 158. When the synchronous movement of the back-up plate 110 and the lifting arm 106 is completed, the die 12 will be in a position wherein it may be removed from the mechanism for the purpose of replacement, cleaning, cooling and relubricating of the die if desired. It is only then necessary to reposition the die in the cradle 114 of the lifting arm 106 with its pin at the end of the arcuate slot 158 in the back-up plate 110. The die will then be ready to be repositioned with the die slide 16 in the same rotative disposition from which it had been removed. The motion described above merely is reversed and, since the pin 22 is located in a predetermined position relative to the lifting arm 106 and accordingly the die slide 16 at all times, the pin 22 will readily pass through the arcuate slot 19 in the bolster 17 of the die slide 16.

The embodiment of the invention illustrated in FIGURES 3–5 may also be provided with a second lifting arm such as illustrated at 108 so that immediately after removing the die 12 from the die slide 16, it may immediately be replaced by another service die wherein a minimum time lag in the operation cycle may be maintained. The lifting arm 108 is also formed with a tubular shaft extension 130 projecting laterally therefrom. The shaft 130 is telescopically received about the shaft 116. This lifting arm 108 is placed in abutment with the tubular shaft 118 and a collar 170 provided with a set screw 168 is placed in contact with the opposite end of the shaft 130 to lock the shaft in place and prevent axial movement along the shaft 116.

A second back-up plate 112 is positioned about the shaft 130 in the same manner as the back-up plate 110 is secured to the tubular shaft 118. Hence, the back-up plate 112 terminates in a bifurcated terminal portion 134 which is secured to the shaft 130 by means of a clamping collar such as 126. A lost-motion connection is formed between the back-up plate 112 and the tubular shaft 130. This is accomplished by threading a screw or pin 164 through the bifurcated end 134 of the back-up plate 112 and having the screw 164 terminating in an arcuate slot in the wall of the tubular shaft 130 similar to the slot 166 in the tubular shaft 118. The back-up plate 112 is also provided with an arcuate guide slot 164 for a purpose similar to the arcuate slot 158 formed in the back-up plate 110.

Hence, after the die 12 has been removed from the die slide, the die 12′ which has already been serviced may be lowered by rotation of the back-up plate 112 and second lifting arm 108 to be positioned in the same rotative disposition in the die slide 16 as was the die 12 which is removed. This is accomplished by first moving the shaft 116 to the right as viewed in FIGURE 3 by means of a hydraulic cylinder or the like 154 whose piston 156 is integrally connected to the shaft 116. Since the tubular shaft extension 130 is confined to move axially with the shaft 116 because of the collar 170, the second lifting arm and back-up plate will be moved axially to the position formerly occupied by the first lifting arm 106 and back-up plate 110. This movement will take place when both the first and second lifting arms are in their inoperative upper positions. Then, the second lifting arm 106 and back-up plate 112 can be rotated to position the new die 12′ in the exact rotative disposition occupied by the former die 12 which has been removed. This will be accomplished as long as the pin 22 on the die 12′ is positioned at the end of the arcuate slot 160 when it is placed within the lifting arm 108.

Means are provided for alternately and independently rotating the lifting arms and their associated back-up plates. In order to rotate the lifting arm 106 and back-up plate 110, a lever in the form of a roller 138 is secured to the shaft 116 by means of a pair of mounting arms 140. A hydraulic cylinder or the like 146 is mounted on the shaft 116. The piston of the hydraulic cylinder 146 has a roller 152 connected at its terminal end. The roller 152 is placed in abutting contact with the roller 138. Upon the introduction of fluid through one of the hydraulic lines 148, the piston and roller 152 will be urged downwardly. The roller 152 will in turn apply a downward force to the roller 138 which when moved will rotate the shaft 116 and hence the lift arm 106 and back-up plate 110. When it is desired to lower the lift arm 106 and back-up plate 110, it will only be necessary to reverse movement of the roller 152 wherein the lift arm 106 will return to its former mode by gravity.

In a like manner, a lever roller 136 is connected and spaced from the tubular shaft 130 by means of a pair of supporting connector arms 142. A second hydraulic cylinder or the like 144 is mounted upon the shaft 116. The hydraulic cylinder 144 has a piston which terminates in a roller 150 is adapted to be placed in contact with the roller 136. Upon the introduction of hydraulic fluid into one of the lines 149 leading to the hydraulic cylinder 144, the roller 150 will be thrust downwardly. This in turn will impart a force to the lever roller 136 which will cause rotation of the tubular shaft 130 and the raising of the lift arm 108 and back-up plate 112. The lift arm 108 and back-up plate 112 may be returned to their former mode by gravity and raising of the roller 150.

The operation of the embodiment of the invention illustrated in FIGURES 3–5 is substantially as follows:

Assuming that the die 12 is to be removed from the die slide 16 and that a die 12' is to be substituted therefor in the same rotative disposition as was the die 12, it will only be necessary to actuate the hydraulic cylinder 146 to cause the roller 152 to apply a downward thrust to the leverage roller 138. Vertical movement of the leverage roller 138 will cause rotation of the first pick-up arm 106. The pick-up arm 106 when rotated will have its cradle 114 lift the die 12 from the die slide 16. The locating pin 22 on the die 12 will move through the arcuate slot 19 in bolster 17 and enter within the arcuate slot 158 in the back-up plate 110. The lifting arm 106 will move relative to the back-up plate 110 until the pin 22 is guided to the end of the slot 158. At this point, the screw 162 extending through the bifurcated end 122 of the back-up plate 110 will contact the end walls of the arcuate slot 166 in the tubular shaft extension 118. Continued rotation of the shaft 116 will then be transmitted to the back-up plate 110 through the screw 162. The back-up plate 110 and lift arm 106 will move in unison until the die slide 16 is cleared and the die 12 is positioned in its inoperative disposition wherein it may be removed and/or maintenance performed upon it. The cylinder 154 will then be actuated to move the shaft 116 and second pick-up arm 108 and its associated back-up plate 112 into the plane formerly occupied by the first pick-up arm 106 and its associated back-up plate. The pressure transmitted to the leverage roller 136 by the roller 150 to maintain the second pick-up arm 108 and its associated back-up plate in its inoperative position can then be relieved to allow the second pick-up arm 108 and its associated back-up plate 112 to drop by gravity and position the die 12' within the die slide 12 in the exact rotative disposition formerly occupied by the die 12. Once the die 12 has been cleaned, cooled and relubricated it will be returned to the first pickup arm 106 with its pin 22 at the end of the arcuate slot 158 in the back-up plate 110. Sufficient pressure is maintained by the roller 152 on the leverage roller 138 to keep the pick-up arm 108 and its associated back-up plate in their inoperative disposition. The die changer is then ready to be recycled.

It will thus be apparent that specially shaped or multiple extrusions emerging from the die will be retained in fixed relationship without any further processing equipment for the extruded product. It will also be appreciated that more than two lifting arms and back-up plates can be arranged about the shaft 116 by suitable telescoping shaft arrangements. With the arrangement depicted in FIGURES 3–5, the replacement dies can be selective or even programmed, if the work schedule of the press requires it.

The present invention may be embodied in other specific forms without departing from the spirit or essential attributes thereof and, accordingly, reference should be made to the appended claims, rather than to the foregoing specification as indicating the scope of the invention.

It is claimed:

1. Apparatus comprising a support means for receiving a die, a die, said die having orientation means thereon, a bolster coupled with said support means for maintaining said die in an upright position, said bolster including guide means for engagement with said orientation means so that said die is rotated to a predetermined rotative position with respect to said support means.

2. Apparatus in accordance with claim 1 wherein said orientation means comprises a pin coupled to said die and said guide means comprises a slot in said bolster, said pin being engageable with said slot to rotate said die to said predetermined position.

3. Apparatus in accordance with claim 1, and including means for transporting said die into and out of engagement with said support means.

4. Apparatus in accordance with claim 3 wherein said means for transporting said die into and out of engagement with said support means comprises guide means for guiding the die to said support means, and a runway in communication with said support means so that the die may be conducted away from the support means.

5. Apparatus in accordance with claim 3 wherein said orientation means comprises a pin coupled to said die and said guide means comprises a slot in said bolster, said pin being engageable with said slot to rotate said die to said predetermined position.

6. Apparatus in accordance with claim 3 wherein said means for transporting said die into and out of engagement with said support means comprises a runway, movable means for delivering a die to one end of said runway, means for elevating a new die to a position above said runway, said means for elevating a new die comprising means for receiving the die from the other end of the runway, and guide means for guiding the new die from said position to said support means.

7. Apparatus in accordance with claim 3 wherein said means for transporting said die into and out of engagement with said support means comprises rotatable shaft means, rotatable lift means secured to said shaft means for moving a die from a predetermined position and returning a second die to the position formerly occupied by first-mentioned die in a manner whereby said second die assumes the exact position of said first-mentioned die in the same rotative position with respect to said support means, back-up means on said shaft means adjacent said lift means for restraining lateral movement of a die when moved by said lift means, said back-up means including guide means cooperating with said orientation means on said die for maintaining a predetermined rotative position of the die relative to said lift means.

8. Apparatus in accordance with claim 7 wherein said orientation means comprises a pin coupled to said die and said guide means comprises a slot in said bolster, said pin being engageable with said slot to rotate said die to a predetermined rotative position.

9. Apparatus in accordance with claim 3 wherein said means for transporting said die into and out of engagement with said support means comprises a first and second rotatable lift arm, said first lift arm being adapted to move said die from a predetermined operative position to an inoperative position wherein it may be removed, said second lift arm being adapted to move a second die from said inoperative position into the identical predetermined operative position formerly occupied by said first die, back-up plates adjacent each of said lift arms for restraining lateral movement of said first and second dies when moved by their respective lift arms, guide means on said back-up plates cooperating with orientation means on the dies for maintaining a predetermined rotative position of the dies relative to said lift arms during movement of said dies between said operative and inoperative positions, and mechanical means connected to said first and second lift arms for rotating them independently and alternately.

References Cited by the Examiner

UNITED STATES PATENTS

| | | | |
|---|---|---|---|
| 2,728,453 | 12/1955 | Thweatt et al. | 72—263 |
| 2,914,171 | 11/1959 | Hoffmann et al. | 72—263 |
| 2,963,151 | 12/1960 | Kent et al. | 72—263 |

CHARLES W. LANHAM, *Primary Examiner.*

H. DIETER HOINKES, *Assistant Examiner.*